(12) United States Patent
Perng et al.

(10) Patent No.: US 8,275,858 B2
(45) Date of Patent: Sep. 25, 2012

(54) METHOD FOR UPDATING FIRMWARE OF RADIO FREQUENCY IDENTIFICATION READER THROUGH NETWORK SYSTEM

(75) Inventors: Shin-Yao Perng, Hsinchu (TW); Chih-Wen Cheng, Hsinchu (TW)

(73) Assignee: Mitac Technology Corp., Hsinchu (TW)

( * ) Notice: Subject to any disclaimer, the term of this patent is extended or adjusted under 35 U.S.C. 154(b) by 1039 days.

(21) Appl. No.: 12/233,477

(22) Filed: Sep. 18, 2008

(65) Prior Publication Data

US 2010/0070966 A1    Mar. 18, 2010

(51) Int. Cl.
*G06F 15/16* (2006.01)
*G06F 9/44* (2006.01)
(52) U.S. Cl. ........................................ 709/219; 717/168
(58) Field of Classification Search .......... 717/168–173; 709/217–219
See application file for complete search history.

(56) References Cited

U.S. PATENT DOCUMENTS

| 7,831,967 B2 * | 11/2010 | Won et al. ..................... 717/172 |
| 2007/0075832 A1 | 4/2007 | Morse et al. |
| 2008/0184151 A1 | 7/2008 | Agarwal et al. |

* cited by examiner

*Primary Examiner* — Chirag R Patel
(74) *Attorney, Agent, or Firm* — Apex Juris, pllc; Tracy M. Heims

(57) ABSTRACT

A method is provided to update firmware of a radio frequency identification (RFID) reader through a network system, wherein a management host issues an update message to a gateway through the network system, and then depending upon the location where reader firmware update data is stored, either the management host transmits the reader firmware update data through the gateway to each designated RFID reader, or the gateway directly transmits the reader firmware update data to each of the designated RFID readers. A microprocessor of the RFID reader stores the received reader firmware update data to a firmware data storage section of a memory unit thereof.

11 Claims, 7 Drawing Sheets

US 8,275,858 B2

METHOD FOR UPDATING FIRMWARE OF RADIO FREQUENCY IDENTIFICATION READER THROUGH NETWORK SYSTEM

FIELD OF THE INVENTION

The present invention relates to firmware updating technology of radio frequency identification (RFID) reader, in particular, to a method for updating firmware of a RFID reader through a network system.

BACKGROUND OF THE INVENTION

A radio frequency identification (RFID) system is comprised of an RFID tag, an RFID reader, and a processor. Data contained in the RFID tag is transmitted in a wireless manner to the RFID reader through radio frequency signals.

With the continuous development and research in the RFID field, the RFID reader must be updated constantly for updating firmware thereof. A conventional method of updating is to rewrite data stored in an internal memory of the RFID reader through a special device. Such a way of updating requires handling the RFID readers one by one and carrying out double check to ensure each RFID reader has been updated. In an application of an RFID system for positioning purposes, a number of separately installed RFID reader sites must be included in order to make a proper determination of the position of an RFID tag. In such an application, once a new system has been developed and the RFID readers must be updated, operators must proceed to each RFID reader site to carry out updating operation, or alternatively, the new data must be transferred to a person-in-charge of each RFID reader site to carry out individual updating operation. This is certainly a very tedious and troublesome process. Further, in some applications where the RFID readers are used for toll collection or automobile management, the RFID readers are in general not regularly attended. In such applications, updating operation requires additional human labor to be sent to the RFID system sites to carry out the operation.

SUMMARY OF THE INVENTION

In view of the above problems, the present invention provides a method for updating firmware of a radio frequency identification (RFID) reader through a network system, wherein a remote management host is employed to carry out remote updating and confirmation for all RFID readers so that there is no need to individually update all the RFID reader in a one-by-one manner. No matter how many RFID readers there are, all the RFID readers can be simultaneously updated through a unified control and data transmission.

The present invention provides a method for updating firmware of an RFID reader through a network system, wherein a remote management host issues an update message to a gateway through the network system, and then depending upon the location where reader firmware update data is stored, either the management host transmits the reader firmware update data through the gateway to each designated RFID reader, or the gateway directly transmits the reader firmware update data to each designated RFID reader. A microprocessor of each RFID reader stores the received reader firmware update data to a firmware data storage section of a memory unit thereof.

In a practical application of the present invention, the gateway compares the update message with the firmware data stored in the firmware data storage section of the memory unit of each RFID reader to generate a reader update request sequence message to the management host in order to allow an operator or user to designate the RFID readers to be updated by using the management host to generate a reader updating designation message to the gateway.

With the technique solution provided by the present invention, once RFID readers are connected to a management host via a gateway and a network system, a user or operator may use the management host to issue an update command to all RFID readers through a one-time operation and storing the update data only in either the management host or the gateway is sufficient to allow all the RFID readers to receive it. Further, with a returning message from the gateway, the user may be readily aware of the updating status of each RFID reader.

Further, the updating operation is carried out through a systematic architecture and an automatic process so that no matter how many RFID readers there are, the user can use the control capability provided by the management host to simultaneously transmit data to all RFID readers through the gateway to update all the RFID readers at the one-time.

BRIEF DESCRIPTION OF THE DRAWINGS

The present invention will be apparent to those skilled in the art by reading the following description of the best mode for carrying out the present invention, with reference to the attached drawings, in which.

DETAILED DESCRIPTION OF THE PREFERRED EMBODIMENTS

Figure 1:
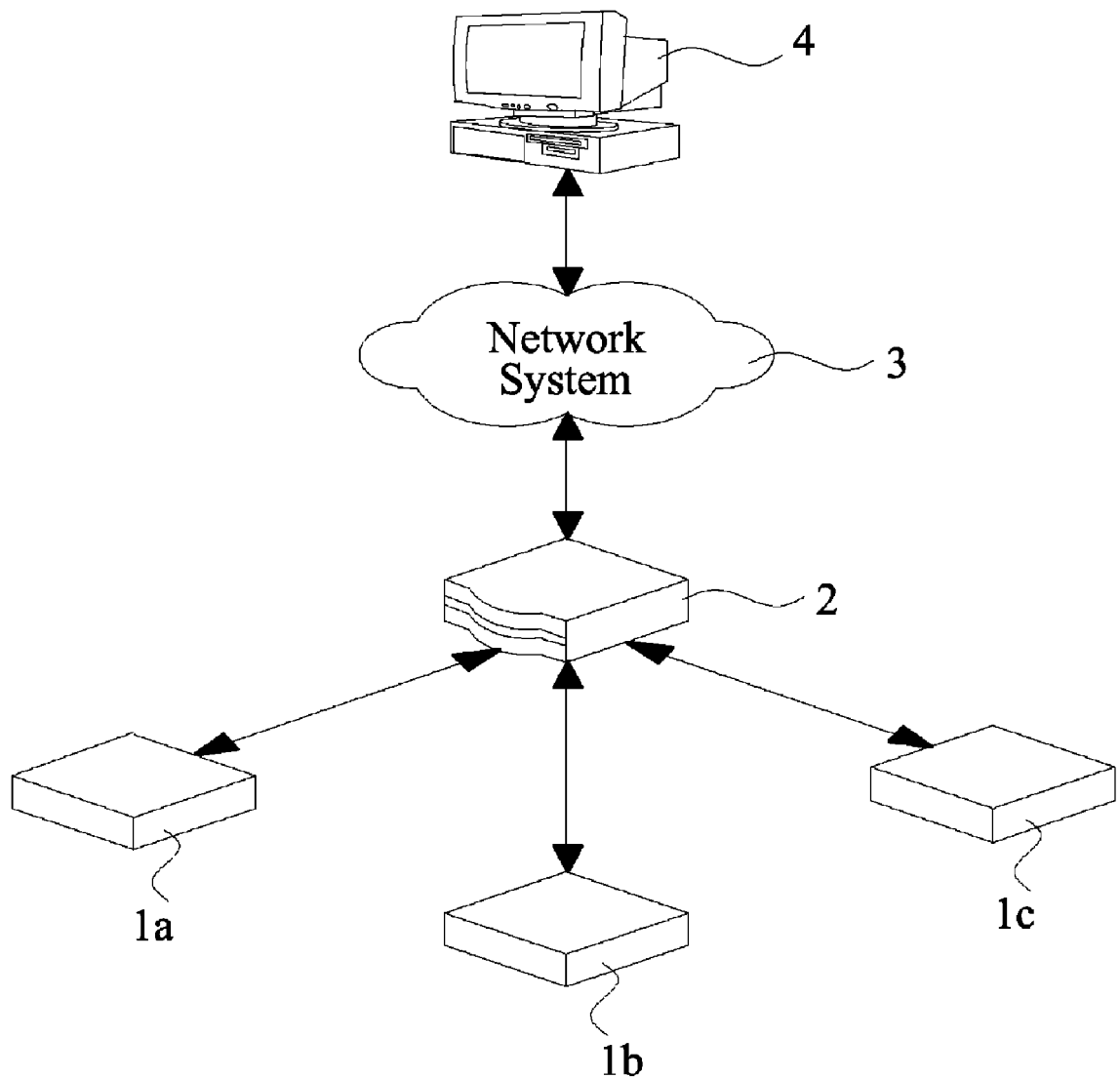
FIG. 1 is a schematic view illustrating a system arrangement by which a method for updating firmware of a radio frequency identification (RFID) reader through a network system in accordance with the present invention is carried out.

With reference to the drawings and in particular to FIG. 1, which is a schematic view illustrating an example of a system arrangement by which a method for updating firmware of a radio frequency identification (RFID) reader through a network system in accordance with the present invention can be carried out, in the example system arrangement for carrying out the method of updating the firmware of an RFID reader through a network system in accordance with the present invention, three RFID readers 1a, 1b, 1c are included, each of which is connected through a gateway 2 to a network system 3 and a remote management host 4. Although only three RFID readers 1a, 1b, 1c are illustrated in the drawings, it is apparent that the number of the RFID readers can be varied in accordance with practical applications, and the actual quantity of the RFID readers is simply determined by the desired needs.

Figure 2:
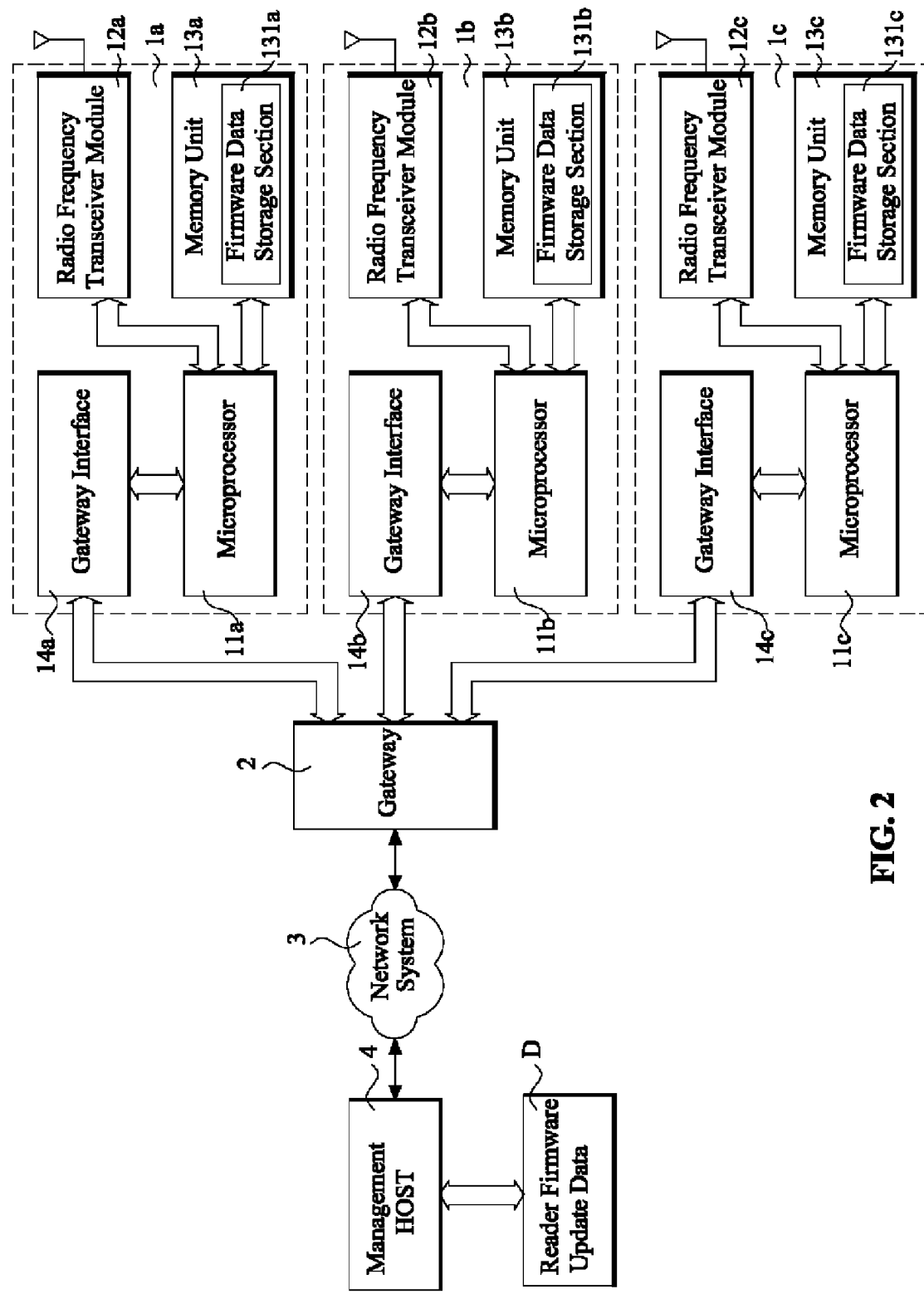
FIG. 2 is a functional block diagram of a system arrangement for carrying out the method for updating firmware of an RFID reader through a network system in accordance with a first embodiment of the present invention.

As shown in FIG. 2, which illustrates a functional block diagram of the system arrangement for carrying out the method for updating firmware of an RFID reader through a network system in accordance with a first embodiment of the present invention, the RFID reader 1a comprises a microprocessor 11a, which is connected to a radio frequency transceiver module 12a, a memory unit 13a, and a gateway connection interface 14a. The RFID reader 1a is connected through the gateway connection interface 14a to the gateway 2. The memory unit 13a contains a firmware data storage section 131a in which at least one set of firmware data is stored.

Similarly, the RFID reader 1b comprises a microprocessor 11b, which is connected to a radio frequency transceiver module 12b, a memory unit 13b, and a gateway connection interface 14b. The RFID reader 1b is connected through the gateway connection interface 14b to the gateway 2. The memory unit 13b contains a firmware data storage section 131b in which at least one set of firmware data is stored.

Also similarly, the RFID reader 1c comprises a microprocessor 11c, which is connected to a radio frequency transceiver module 12c, a memory unit 13c, and a gateway connection interface 14c. The RFID reader 1c is connected through the gateway connection interface 14c to the gateway 2. The memory unit 13c contains a firmware data storage section 131c in which at least one set of firmware data is stored. The management host 4 is provided with a set of reader firmware update data D, which is for the update of the RFID reader 1a, 1b, 1c.

Figure 3:
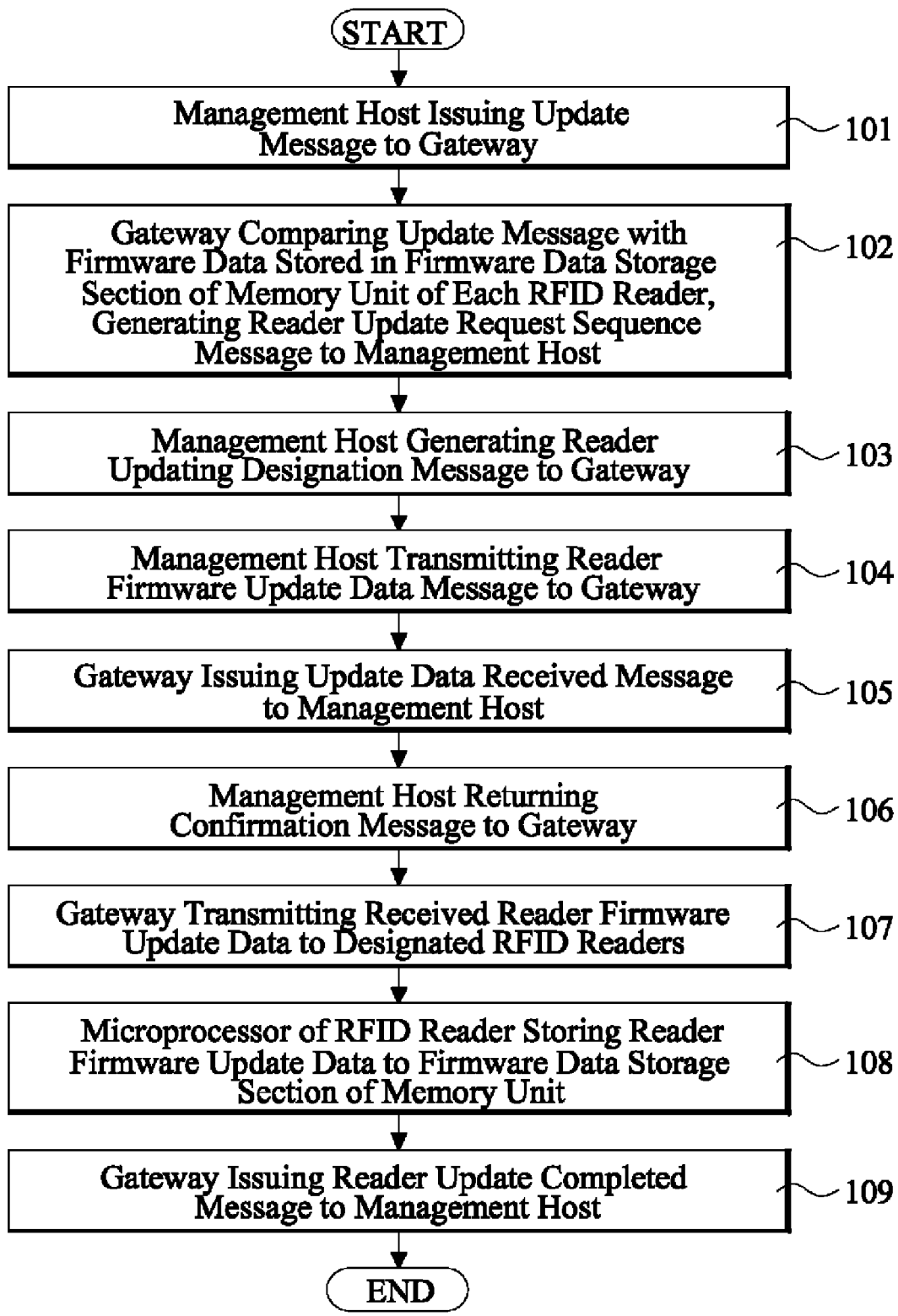
FIG. 3 is a flow chart of the method for updating firmware of an RFID reader through a network system in accordance with the first embodiment of the present invention.
Figure 4:
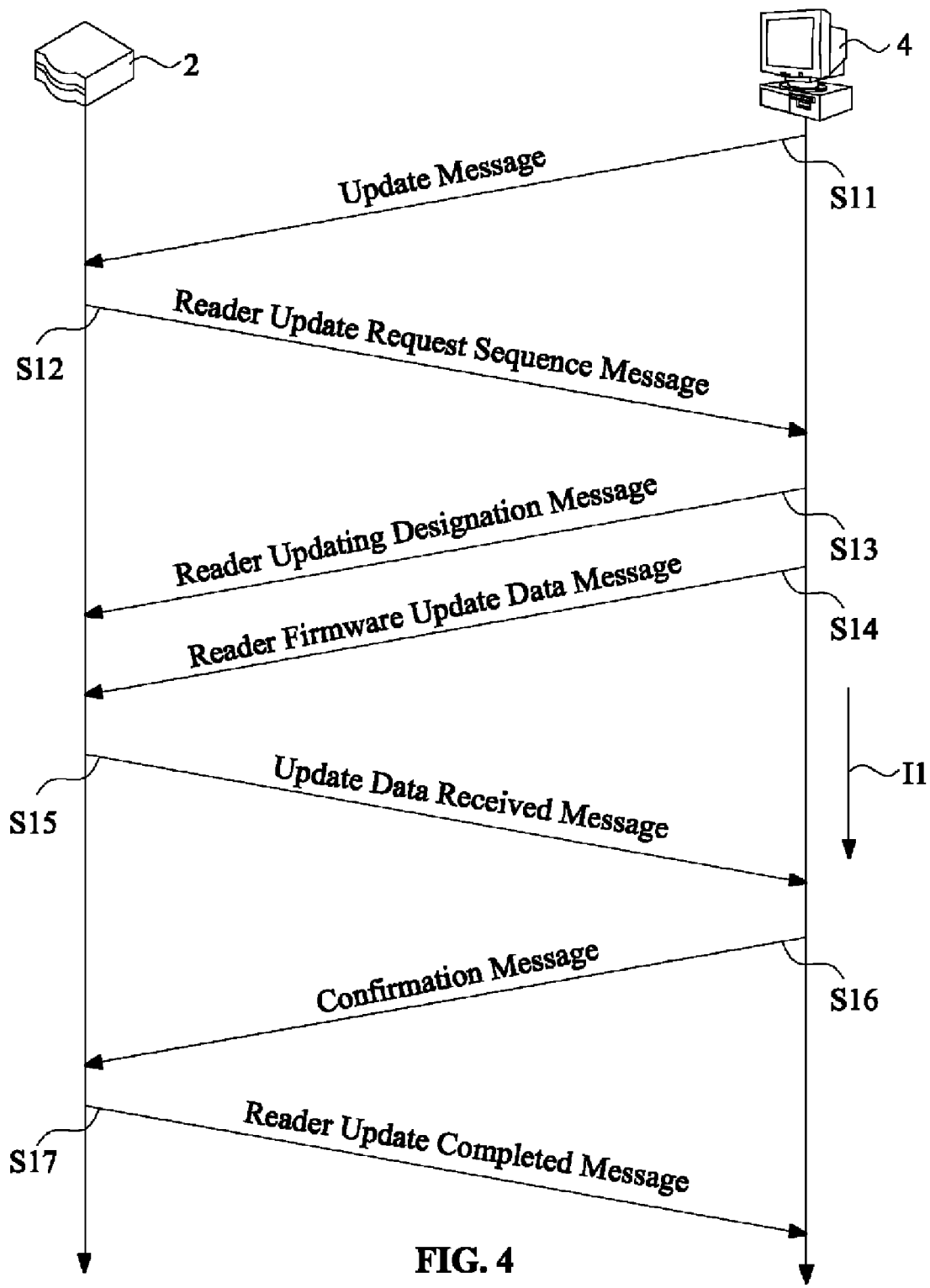
FIG. 4 is a schematic timing diagram for transmission between the management host and the gateway in accordance with the first embodiment of the present invention.

Also referring to FIGS. 3 and 4, which respectively show a flow chart of the method for updating firmware of an RFID reader through a network system in accordance with the first embodiment of the present invention and a schematic timing diagram for transmission between the management host and the gateway, the management host 4 and the gateway 2 carry out transmission therebetween in a predetermined timing direction 11. Firstly, the management host 4 issues an update message S11 to the gateway 2 (step 101) to provide information related to a current update operation. The update message S11 contains at least one data set selected from a data group including error check code, version number of update data, and length of update data.

The gateway 2 compares the update message S11 with firmware data stored in the firmware data storage section 131a, 131b, 131c of the memory unit 13a, 13b, 13c of the RFID readers 1a, 1b, 1c. For example, the version number of firmware data is compared with the version number of the update data to determine whether they are identical or not, or the data length of the firmware data is compared with the length of the updated data to make a decision for whether to carry out the update operation. Based on such a decision, a reader update request sequence message S12 is generated to the management host (step 102).

The management host 4 receives the reader update request sequence message S12 that contains reader identification data, reader status data, and update request sequence ending message, by which a user may realize which ones of the RFID readers 1a, 1b, 1c need to be updated, as well as other related information. The user may then base on the reader update request sequence message S12 to designate a target reader for updating and the management host 4 generates a reader updating designation message S13 to the gateway 2 (step 103).

The management host 4 then transmits a reader firmware update data message S14 that carries the reader firmware update data D stored in the management host 4 to the gateway 2 (step 104). The gateway 2, upon complete reception of the reader firmware update data message S14, issues an update data received message S15 to the management host (step 105). The management host 4, upon receiving the update data received message S15, returns a confirmation message S16 to the gateway 2 (step 106) to complete the handover operation realized with the sequence of communications.

The gateway 2 transmits the received reader firmware update data D to the designated RFID reader 1a, for example, (step 107). It is noted here that in this example, it is assumed that only the RFID reader 1a is designated for updating. The microprocessor 11a of the RFID reader 1a stores the received reader firmware update data D to the firmware data storage section 131a of the memory unit 13a to complete the update operation (step 108). In case that all the RFID readers 1a, 1b, 1c are designated for updating, the gateway 2 transmits the reader firmware update data D to all the RFID readers 1a, 1b, 1c to simultaneously update the RFID readers 1a, 1b, 1c. After the update operation is completed, the gateway 2 issues a reader update completed message S17 to the management host 4 (step 109) to inform the management host 4 of the completion of the update operation.

Figure 5:
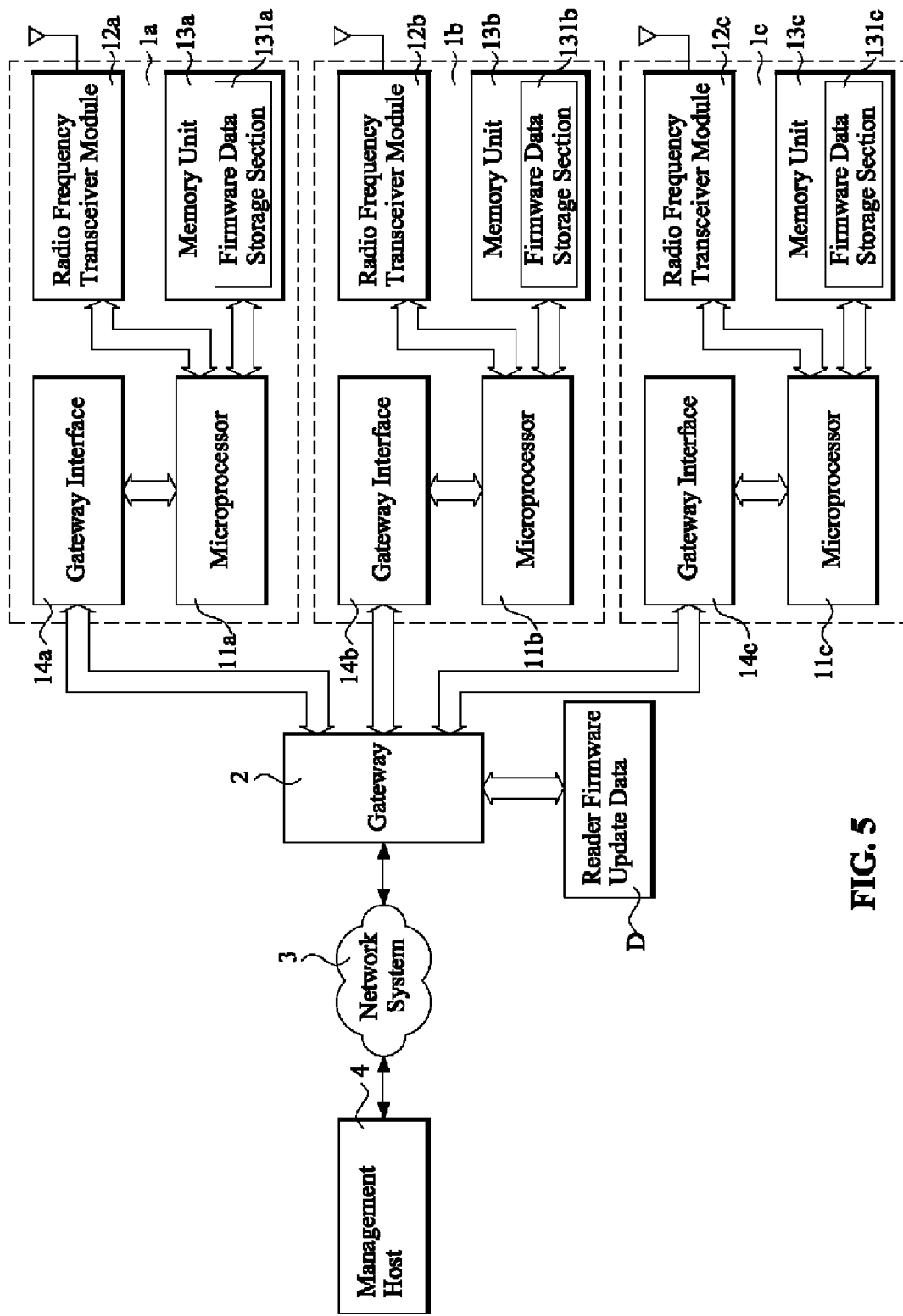
FIG. 5 is a functional block diagram of a system arrangement for carrying out the method for updating firmware of an RFID reader through a network system in accordance with a second embodiment of the present invention.

Referring to FIG. 5, which shows a functional block diagram of the system arrangement for carrying out the method for updating firmware of an RFID reader through a network system in accordance with a second embodiment of the present invention, the system functional block diagram of the second embodiment is substantially identical to the that of the first embodiment, so that identical parts/components are designated with the same reference numerals to set up correspondence therebetween. A difference of the second embodiment from the first embodiment is that the reader firmware update data D is provided to the gateway 2, rather than the management host 4, which is the case of the first embodiment.

Figure 6:
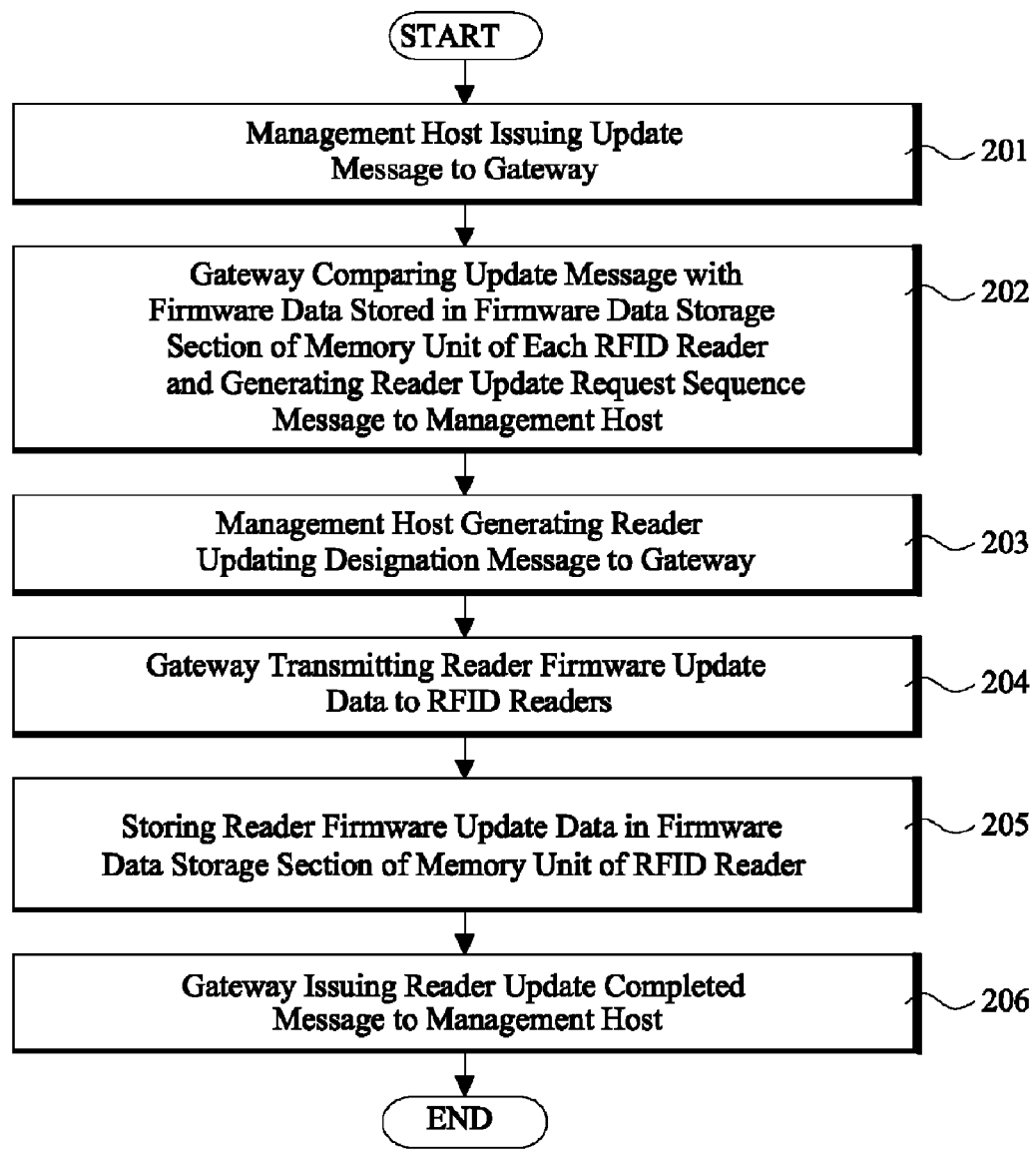
FIG. 6 is a flow chart of the method for updating firmware of an RFID reader through a network system in accordance with the second embodiment of the present invention.
Figure 7:
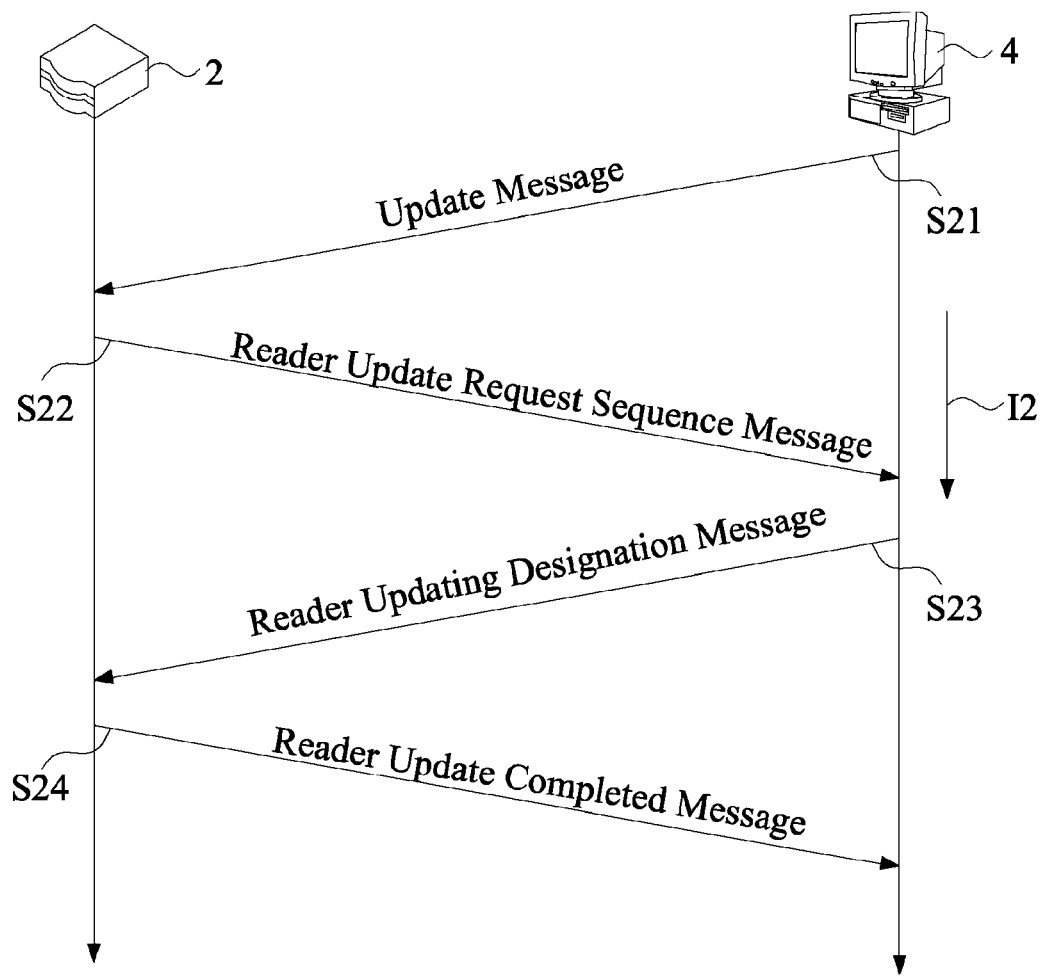
FIG. 7 is a schematic timing diagram for transmission between the management host and the gateway in accordance with the second embodiment of the present invention.

Referring to both FIGS. 6 and 7, which respectively show a flow chart of the method for updating firmware of an RFID reader through a network system in accordance with the second embodiment of the present invention and a schematic timing diagram for transmission between the management host and the gateway, the operation flow of the method in accordance with the second embodiment is substantially identical to that of the first embodiment, wherein the management host 4 and the gateway 2 carry out transmission in a predetermined timing direction 12. Since in the second embodiment, the reader firmware update data D is set in the gateway 2, no transmission from management host 4 is needed in carrying out the update operation. Thus, message transmission from the management host 4 can be reduced, and associated steps can be eliminated.

A user first uses the management host 4 to issue an update message S21 to initiate the update operation (step 201). Based on the update message S21, the gateway 2 generates a reader update request sequence message S22, which is sent back to the management host 4 (step 202). The management host 4 determines which RFID reader is to be updated according to the reader update request sequence message S22 from the gateway 2 and issues a reader updating designation message S23 (step 203). At this moment, the gateway 2 directly transmits the reader firmware update data D to the RFID reader 1a (step 204). Again, it is assumed that only the RFID reader 1a is designated for updating in this example. The reader firmware update data D, once received by the RFID reader 1a, is stored in the firmware data storage section 131a of the memory unit 13a to complete the update operation (step 205).

After the update operation is completed, the gateway 2 issues a reader update completed message S24 to the management host 4 (step 206).

Although the present invention has been described with reference to the preferred embodiments thereof, as well as the best modes for carrying out the present invention, it is apparent to those skilled in the art that a variety of modifications and changes may be made without departing from the scope of the present invention which is intended to be defined by the appended claims.

What is claimed is:

1. A method for updating firmware of a plurality of radio frequency identification (RFID) readers, wherein each of the RFID readers is connected to a remote management host via a gateway and a network system, the management host containing at least one set of reader firmware update data, the RFID reader comprising a microprocessor, a radio frequency transceiver module, a memory unit and a gateway connection interface, the RFID reader being connected to the gateway through the gateway connection interface, the memory unit comprising a firmware data storage section that stores therein at least one set of firmware data, the method comprising the following steps:
    (a) the management host issuing an update message to the gateway;
    (b) the gateway comparing the update message with the firmware data stored in the firmware data storage section of the memory unit of each of the RFID readers to generate a reader update request sequence message to the management host;
    (c) the management host generating a reader updating designation message to the gateway in accordance with the reader update request sequence message;
    (d) the management host transmitting the reader firmware update data to the gateway;
    (e) the gateway transmitting the reader update data to the RFID readers; and
    (f) the microprocessor of the RFID reader storing the reader firmware update data to the firmware data storage section of the memory unit.

2. The method as claimed in claim 1 further comprising the following steps before step (e):
    (d1) the gateway receiving message of the update data and then transmitting an update data received message to the management host;
    (d2) the management host receiving the update data received message and returning a confirmation message to the gateway.

3. The method as claimed in claim 1 further comprising, after step (f), a step of the gateway transmitting a reader update completed message to the management host.

4. The method as claimed in claim 1, wherein the network system includes one of the Internet and a local area network.

5. The method as claimed in claim 1, wherein the update message contains at least one data set selected from a data group including error check code, version number of update data, and length of update data.

6. The method as claimed in claim 1, wherein the reader update request sequence message contains reader identification data, reader status data, and update request sequence ending message.

7. A method for updating firmware of a plurality of radio frequency identification (RFID) readers through a network system, wherein each of the RFID readers is connected to the network system and a management host via a gateway, the gateway containing at least one set of reader firmware update data, the RFID reader comprising a microprocessor, a radio frequency transceiver module, a memory unit, and a gateway connection interface, the RFID reader being connected to the gateway through the gateway connection interface, the memory unit comprising a firmware data storage section that stores therein at least one set of firmware data, the method comprising the following steps:
    (a) the management host issuing an update message to the gateway;
    (b) the gateway comparing the update message with the firmware data stored in the firmware data storage section of the memory unit of each of the RFID readers to generate a reader update request sequence message to the management host;
    (c) the management host generating a reader updating designation message to the gateway in accordance with the reader update request sequence message;
    (d) the gateway simultaneously transmitting the reader firmware update data to each of the designated RFID readers; and
    (e) the microprocessor of each of the RFID readers storing the reader firmware update data to the firmware data storage section of the memory unit.

8. The method as claimed in claim 7 further comprising, after step(e), a step of the gateway transmitting a reader update completed message to the management host.

9. The method as claimed in claim 7, wherein the network system includes one of the Internet and a local area network.

10. The method as claimed in claim 7, wherein the update message contains at least one data set selected from a data group including error check code, version number of update data, and length of update data.

11. The method as claimed in claim 8, wherein the reader update request sequence message contains reader identification data, reader status data, and update request sequence ending message.

* * * * *